United States Patent
Pu et al.

(10) Patent No.: US 10,504,365 B2
(45) Date of Patent: Dec. 10, 2019

(54) NAVIGATION METHOD, DEVICE AND SYSTEM

(71) Applicant: Hangzhou Hikvision Digital Technology Co., Ltd., Hangzhou, Zhejiang (CN)

(72) Inventors: Shiliang Pu, Zhejiang (CN); Jianxin Meng, Zhejiang (CN); Jiang Zhu, Zhejiang (CN); Linjie Shen, Zhejiang (CN); Hai Yu, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/312,699

(22) PCT Filed: Feb. 13, 2017

(86) PCT No.: PCT/CN2017/073346
§ 371 (c)(1),
(2) Date: Dec. 21, 2018

(87) PCT Pub. No.: WO2018/000822
PCT Pub. Date: Jan. 4, 2018

(65) Prior Publication Data
US 2019/0164428 A1 May 30, 2019

(30) Foreign Application Priority Data
Jun. 29, 2016 (CN) .......................... 2016 1 0522697

(51) Int. Cl.
*G08G 1/14* (2006.01)
*G01C 21/36* (2006.01)
(Continued)

(52) U.S. Cl.
CPC ............ *G08G 1/143* (2013.01); *G01C 21/32* (2013.01); *G01C 21/362* (2013.01);
(Continued)

(58) Field of Classification Search
CPC .. G08G 1/143; G08G 1/146; G08G 1/096816; G06F 16/29; G01C 21/32; G01C 21/362; G01C 21/3623; G06K 9/00812
(Continued)

(56) References Cited

U.S. PATENT DOCUMENTS 6,694,259 B2 * 2/2004 Curbow ................. G01C 21/26
340/468
8,655,593 B1 2/2014 Davidson
(Continued)

FOREIGN PATENT DOCUMENTS

CN 102829775 A 12/2012
CN 102951089 A 3/2013
(Continued)

*Primary Examiner* — John A Tweel, Jr.
(74) *Attorney, Agent, or Firm* — Bret E. Field; Bozicevic, Field & Francis LLP

(57) ABSTRACT

The embodiments of the present application provide a navigation method, device and system. The method is applied to a server. The method includes: receiving current position feature information sent by a mobile terminal, determining a position of an area matching the current position feature information based on the current position feature information and a database stored in the server, and taking the position as an initial position; determining a position of one empty area of the areas as a target position based on position information corresponding to respective areas and correspondence relationship between identification information of the respective areas and the respective feature information currently stored in the database; and determining a first route from the initial position to the target position and displaying the first route on an electronic map (Continued)

of the mobile terminal. In embodiments of the present application, it is possible to provide the user with accurate navigation information and make him quickly find an empty parking space in a large parking lot.

16 Claims, 7 Drawing Sheets

(51) Int. Cl.
    *G08G 1/0968*     (2006.01)
    *G06F 16/29*     (2019.01)
    *G01C 21/32*     (2006.01)
    *G01S 5/00*     (2006.01)
    *G06K 9/00*     (2006.01)
    *G07C 5/00*     (2006.01)

(52) U.S. Cl.
    CPC ........ *G01C 21/3623* (2013.01); *G01S 5/0036* (2013.01); *G06F 16/29* (2019.01); *G06K 9/00812* (2013.01); *G07C 5/008* (2013.01)

(58) Field of Classification Search
    USPC ...................................................... 340/932.2
    See application file for complete search history.

(56) References Cited

U.S. PATENT DOCUMENTS

| | | | |
|---|---|---|---|
| 9,631,941 B2* | 4/2017 | Sugimoto | G01C 21/3602 |
| 2004/0015290 A1* | 1/2004 | Curbow | G01C 21/26 |
| | | | 701/117 |
| 2012/0287279 A1* | 11/2012 | Tanaka | G08G 1/168 |
| | | | 348/148 |
| 2012/0326893 A1 | 12/2012 | Glezerman | |
| 2014/0176348 A1 | 6/2014 | Acker, Jr. et al. | |
| 2017/0103571 A1* | 4/2017 | Beaurepaire | G01C 21/3667 |
| 2017/0148324 A1* | 5/2017 | High | G06K 9/00771 |

FOREIGN PATENT DOCUMENTS

| | | |
|---|---|---|
| CN | 103398717 A | 11/2013 |
| CN | 103632572 A | 3/2014 |
| CN | 103776443 A | 5/2014 |
| CN | 104422439 A | 3/2015 |
| CN | 104457734 A | 3/2015 |
| CN | 204706190 U | 10/2015 |
| CN | 105427591 A | 3/2016 |
| CN | 105513403 A | 4/2016 |
| CN | 105551301 A | 5/2016 |
| WO | WO2006126358 A1 | 11/2006 |
| WO | WO2011071548 A1 | 6/2011 |
| WO | WO2015113330 A1 | 8/2015 |

* cited by examiner

Obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas ~ S201

Receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between identification information of the respective areas and the respective feature information currently stored in the database ~ S202

Fig. 4

Obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas — S201

Receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between identification information of the respective areas and the respective feature information currently stored in the database — S202

Receiving a current position of the mobile terminal sent by the server and displaying the current position on the electronic map of the mobile terminal — S203

Fig. 5

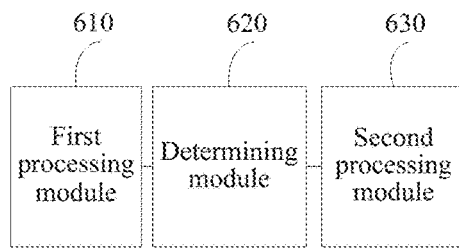

Fig. 6

NAVIGATION METHOD, DEVICE AND SYSTEM

The present application claims the priority to a Chinese patent application No. 201610522697.8 filed with the State Intellectual Property Office of People's Republic of China on Jun. 29, 2016 and entitled "A navigation method, device and system", which is incorporated herein by reference in its entirety.

TECHNICAL FIELD

The present application relates to the field of navigation technology, and more particularly, to a navigation method, device and system.

BACKGROUND

With the rapid growth of the economy, vehicle population keeps on increasing, and the number of parking lots increases accordingly and the sizes thereof continuously increase. A large parking lot located in a place with large flows of people, on the one hand meets the need of driving and safely parking vehicles, but on the other hand makes the user easy to get lost therein because of the huge size of the site and the complex building structure. For example, when the user enters the parking lot, he/she cannot find an empty parking space.

A relevant method for positioning a parking space can give the user an identification of an empty parking space when entering the parking lot to park, by installing parking cameras in the parking lot. Specifically, statuses of respective parking spaces in the entire parking lot can be displayed on the user's mobile terminal, so that the user can select one empty parking space.

A parking camera is a monitoring camera installed in front of the parking space to photograph the status of the parking space. Specifically, it can be used to monitor whether every parking space is an empty parking space or not.

The method for positioning a parking space described above can only inform the user of the identification of the empty parking space that the user wants to find, and cannot tell the user how to reach the empty parking space or inform the user of his/her current position. In a large parking lot, even if the user knows the identification of the empty parking space, it is difficult for the user to find the empty parking space. Therefore, how to provide the user with accurate navigation information to make him find the empty parking space in a large parking lot quickly is a problem to be solved.

SUMMARY

The purpose of the embodiments of the present application is to provide a navigation method, device and system, so as to provide the user with accurate navigation information to make him quickly find an empty parking space in a large parking lot. Specific technical solutions are as follows.

In a first aspect, an embodiment of the present application provides a navigation method applied to a server, the method comprising:

receiving current position feature information sent by a mobile terminal, determining a position of an area matching the current position feature information based on the current position feature information and a database stored in the server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

determining a position of one empty area of the areas as a target position based on the position information corresponding to the respective areas and the correspondence relationship between the identification information of the respective areas and the respective feature information currently stored in the database; and determining a first route from the initial position to the target position, and displaying the first route on an electronic map of the mobile terminal.

Optionally, determining a position of one empty area of the areas as a target position based on the position information corresponding to the respective areas and the correspondence relationship between the identification information of the respective areas and the respective feature information currently stored in the database includes:

displaying positions of respective empty areas on the electronic map of the mobile terminal based on the position information corresponding to the respective areas and the correspondence relationship between the identification information of the respective areas and the respective feature information currently stored in the database, receiving one of the positions of respective empty areas sent by the mobile terminal, and determining this position as the target position; or determining positions of all current empty areas and determining a position of one of the empty areas as the target position based on the position information corresponding to the respective areas and the correspondence relationship between the identification information of the respective areas and the respective feature information currently stored in the database.

Optionally, after displaying the first route on an electronic map of the mobile terminal, the method further includes:

detecting a current position of the mobile terminal, and displaying the current position on the electronic map of the mobile terminal.

Optionally, detecting a current position of the mobile terminal includes:

obtaining a movement state of the mobile terminal based on an inertial sensor in the mobile terminal; and determining the current position of the mobile terminal based on the initial position of the mobile terminal and the movement state.

Optionally, after displaying the current position on an electronic map of the mobile terminal, the method further includes:

receiving current position feature information sent by the mobile terminal after receiving a position correction instruction sent by the mobile terminal, determining a position of an area matching the current position feature information based on the current position feature information and the database, and updating the current position of the mobile terminal with this position.

Optionally, detecting a current position of the mobile terminal includes:

receiving current position feature information periodically sent by the mobile terminal, determining a position of an area matching the current position feature information based on the current position feature information and the database, and taking the position as the current position.

Optionally, the method further includes:

detecting whether an offset between the current position and the first route is greater than a predetermined threshold; and if the offset is greater than the predetermined threshold, determining a second route from the current position to the target position based on the current position and the target position, and displaying the second route on the electronic map of the mobile terminal.

Optionally, the database stores the identification information and the position information corresponding to each of parking spaces and a license plate number or image of a vehicle parked currently, and the current position feature information includes at least one of the identification information of the parking space, a license plate number or a comparison image.

Optionally, for each area, a feature image of the area is acquired by an image acquiring device corresponding to the area after detect a change of content included in the area.

In a second aspect, an embodiment of the present application provides a navigation method applied to a mobile terminal, the method comprising:

obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

Optionally, after displaying the route on an electronic map, the method further includes:

receiving a current position of the mobile terminal sent by the server and displaying the current position on the electronic map of the mobile terminal.

Optionally, obtaining current position feature information includes:

receiving the current position feature information input by the user;

acquiring a feature image and taking the feature image as the current position feature information; or acquiring a feature image and extracting the current position feature information in the feature image, wherein the current position feature information includes at least one of an image including a preset area in the feature image and a character in the preset area.

Optionally, the database stores the identification information and the position information corresponding to each of parking spaces and a license plate number or image of a vehicle parked currently, and the current position feature information includes at least one of the identification information of the parking space, a license plate number or a comparison image.

In a third aspect, an embodiment of the present application provides a navigation device applied to a server, the device comprising:

a first processing module used to receive current position feature information sent by a mobile terminal, determine a position of an area matching the current position feature information based on the current position feature information and a database stored in the server, and take the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

a determining module used to determine a position of one empty area of the areas as a target position based on the position information corresponding to the respective areas and the correspondence relationship between the identification information of the respective areas and the respective feature information currently stored in the database; and a second processing module used to determine a first route from the initial position to the target position, and display the first route on an electronic map of the mobile terminal.

Optionally, the determining module is specifically used to display positions of respective empty areas on the electronic map of the mobile terminal based on position information corresponding to the respective areas and correspondence relationship between identification information of the respective areas and the respective feature information currently stored in the database, receive one of the positions of respective empty areas sent by the mobile terminal, and determine this position as the target position; or determine positions of all current empty areas based on the position information corresponding to the respective areas and the correspondence relationship between the identification information of the respective areas and the respective feature information currently stored in the database, and determine a position of one of the empty areas as the target position.

Optionally, the device further includes:

a detecting module used to detect a current position of the mobile terminal, and display the current position on the electronic map of the mobile terminal.

Optionally, the detecting module includes:

an obtaining sub-module used to obtain a movement state of the mobile terminal based on an inertial sensor in the mobile terminal; and a determining sub-module used to determining a current position of the mobile terminal based on the initial position of the mobile terminal and the movement state.

Optionally, the device further includes:

a third processing module used to receive the current position feature information sent by the mobile terminal when receiving a position correction instruction sent by the mobile terminal, determine a position of an area matching the current position feature information based on the current position feature information and the database, and update the current position of the mobile terminal with this position.

Optionally, the detecting module is specifically used to receive the current position feature information periodically sent by the mobile terminal, determine a position of an area matching the current position feature information based on the current position feature information and the database, and take the position as the current position.

Optionally, the detecting module is also used to detect whether an offset between the current position and the first route is greater than a predetermined threshold; and the device further includes:

a fourth processing module used to determine a second route from the current position to the target position based on the current position and the target position, and display the second route on the electronic map of the mobile terminal, when the detecting module detects that the offset between the current position and the first route is greater than the predetermined threshold.

Optionally, the database stores the identification information and the position information corresponding to each of parking spaces and a license plate number or image of a vehicle parked currently, and the current position feature information includes at least one of identification information of a parking space, a license plate number or a comparison image.

Optionally, for each area, a feature image of the area is acquired by an image acquiring device corresponding to the area after detecting a change of content included in the area.

In a fourth aspect, an embodiment of the present application provides a navigation device applied to a mobile terminal, the device comprising:

a first processing module used to obtain current position feature information and send the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and a second processing module used to receive a route sent by the server and display the route on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

Optionally, the device further includes:

a receiving module used to receive a current position of the mobile terminal sent by the server and display the current position on the electronic map of the mobile terminal.

Optionally, the first processing module is specifically used to receive current position feature information input by the user;

acquire a feature image and take the feature image as the current position feature information; or acquire a feature image and extract current position feature information in the feature image, wherein the current position feature information includes at least one of an image including a preset area in the feature image and a character in the preset area.

Optionally, the database stores the identification information and the position information corresponding to each of parking spaces and a license plate number or image of a vehicle parked currently, and the current position feature information includes at least one of identification information of a parking space, a license plate number, or a comparison image.

In a fifth aspect, the embodiment of the present application provides a navigation system including image acquiring devices installed in respective areas, a server and a mobile terminal, wherein, the image acquiring devices are used to acquire feature images of corresponding areas;

the server is used to perform the navigation method as described in the first aspect;

the mobile terminal is used to perform the navigation method as described in the second aspect.

In a sixth aspect, the embodiment of the present application provides a navigation system including image acquiring devices installed in respective areas, a navigation device located in a server as described in the third aspect, and a navigation device located in a mobile terminal as described in the fourth aspect.

In a seventh aspect, the present application provides a storage medium for storing executable program codes, which are used to perform the navigation method described in the first aspect when being executed.

In an eighth aspect, the present application provides a storage medium for storing executable program codes, which are used to perform the navigation method described in the second aspect when being executed.

In a ninth aspect, the present application provides an application for performing the navigation method described in the first aspect when being executed.

In a tenth aspect, the present application provides an application for performing the navigation method described in the second aspect when being executed.

In an eleventh aspect, the present application provides an electronic device comprising:

a processor, a memory, a communication interface and a bus, wherein, the processor, the memory and the communication interface are connected and communicated with each other via the bus;

the memory stores executable program codes; and the processor executes a program corresponding to the executable program codes by reading the executable program codes stored in the memory to perform the navigation method as described in the first aspect.

In a twelfth aspect, the present application provides an electronic device comprising:

a processor, a memory, a communication interface and a bus, wherein the processor, the memory and the communication interface are connected and communicated with each other via the bus;

the memory stores executable program codes; and the processor executes a program corresponding to the executable program codes by reading the executable program codes stored in the memory to perform the navigation method as described in the second aspect.

The embodiment of the present application provides a navigation method, device and system. A server can accurately determine an initial position based on current position feature information sent by a mobile terminal and a database stored in the server, and can determine a position of one empty area in the database as a target position. Further, the server can determine a route from the initial position to the target position based on the initial position and the target position, and display the route on an electronic map of the mobile terminal. Therefore, it is possible to provide the user with accurate navigation information and make him find an empty parking space in a large parking lot quickly.

BRIEF DESCRIPTION OF THE DRAWINGS

In order to explain the technical solutions of embodiments of the present invention or of the prior art more clearly, the accompanying figures required to be used in the description of the embodiments or the prior art will be described briefly below. Obviously, the figures described below are just some embodiments of the present invention and other figures can be obtained by those skilled in the art based on these figures without any creative efforts.

FIG. 4 is another flow chart of a navigation method provided according to an embodiment of the present application.

FIG. 5 is another flow chart of a navigation method provided according to an embodiment of the present application.

FIG. 6 is a schematic structural view of a navigation device provided according to an embodiment of the present application.

DETAILED DESCRIPTION

In order to make those skilled in the art better understand the technical solutions in the embodiments of the present application, the technical solutions in the embodiments of the present invention will be described clearly and completely below in conjunction with the accompanying figures of embodiments of the present invention. Obviously, the embodiments described are merely some of, not all of the embodiments of the present invention. All other embodiments obtained by those skilled in the art based on the embodiments of the present application without any creative efforts shall fall within the scope of protection of the present application.

It should be noted that the embodiments of the present application and the features in the embodiments can be combined with each other without conflict. The present application will be described in detail below with reference to the accompanying drawings in conjunction with the embodiments.

In the embodiment of the present application, in order to provide the user with accurate navigation information and improve the user experience, a database can be created in advance in a server. The database can be created by the server according to correspondence relationship between respective feature information and identification information of the respective areas as well as position information corresponding to the respective areas. An image acquiring device corresponding to each area acquires a feature image of this corresponding area, and obtains corresponding feature information based on the feature image and then sends the corresponding feature information to the server.

For example, when the navigation information in a parking lot is provided for the user, identification information, position information, and feature information of respective parking spaces in the parking lot can be stored in the database. When a parking space is in an empty state currently, the feature information thereof indicates the empty state. When the parking space is in a non-empty state currently, the feature information thereof is information of a vehicle parked in this parking space currently, such as a license plate number, image of the vehicle and the like.

The database stored in the server can be shown as the following table:

| Identification information | Position information | Feature information |
| --- | --- | --- |
| 1 | x1, y1 | Idle |
| 2 | x2, y2 | JING Nxxx |
| 3 | x3, y3 | JIN Axxx |
| ... | ... | ... |
| N | xn, yn | Idle |

When an area is not empty, corresponding feature information thereof can be stored in the form of text, and can also be stored in the form of an image.

Figure 1:
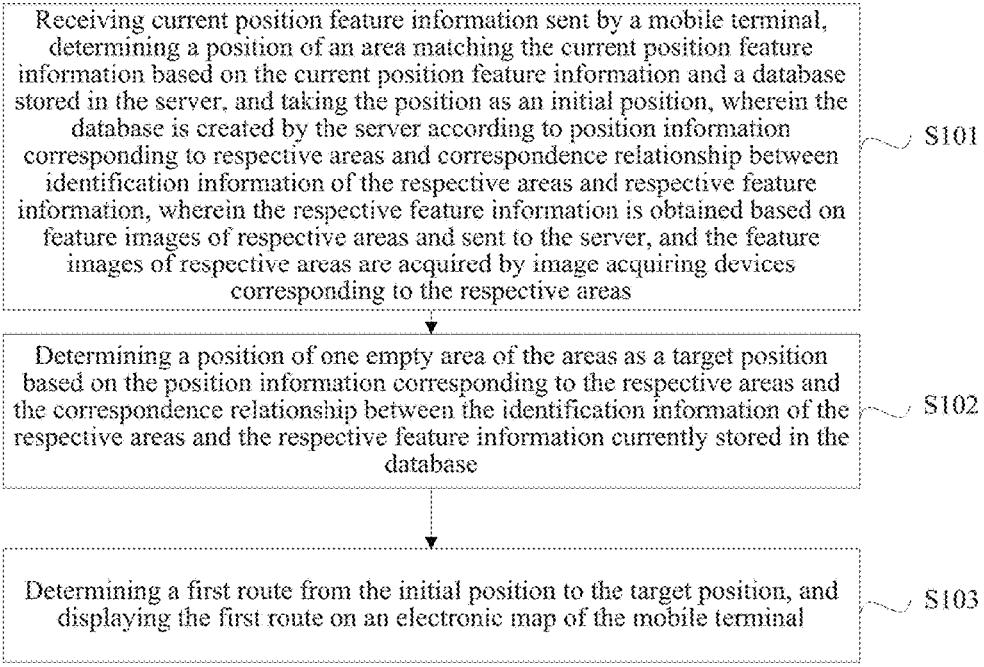
FIG. 1 is a flow chart of a navigation method provided according to an embodiment of the present application.

In order to provide the user with accurate navigation information and improve the user experience, the present application provides a navigation method applied to a server. As shown in FIG. 1, the method can include steps S101-S103.

In S101, current position feature information sent by a mobile terminal is received, and a position of an area matching the current position feature information is determined based on the current position feature information and a database stored in the server, and the position is taken as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas.

In the embodiment of the present application, when entering a parking lot, a user uses his/her mobile terminal to obtain the navigation information through a server corresponding to the parking lot.

Specifically, the user can input the current position feature information through the mobile terminal. Further, the mobile terminal can send the current position feature information to the server, so that the server determines a position of an area matching the current position feature information based on the current position feature information and the database stored therein, and takes the position as an initial position.

The current position feature information input by the user through the mobile terminal can be at least one of a parking space identification, a license plate number, a comparison image or the like.

For example, when entering a parking lot, the user can input identification of a parking space which he/she is on currently into the mobile terminal as the current position feature information; or, when there is a vehicle parked at the user's current position, the user can input the license plate number of the vehicle as the current position feature information; or, the user can also take a feature image at the his/her current position by a photographing function of the mobile terminal and obtain the current position feature information based on the feature image.

When obtaining the feature image, the mobile terminal can send directly the feature image to the server as the current position feature information. Alternatively, the mobile terminal can perform a feature extraction on an acquired feature image to extract the feature information therein, and send it to the server as the current position feature information. When the mobile terminal extracts the feature information in the feature image, the feature information extracted can be an image, and can be also a text.

For example, the mobile terminal can use any one of the existing image analysis methods to identify the feature information such as a parking space identification and a license plate number in the feature image, and send the feature information extracted to the server in the form of text as the current position feature information. Alternatively, when identifying the feature information such as the parking space identification and the license plate number in the feature image, the mobile terminal can obtain an image of an area containing the feature information and send the image to the server as the current position feature information.

Any of the existing methods can be employed in the process of extracting the feature information from the feature image by the mobile terminal, which will not be described in the embodiment of the present application.

After obtaining the current position feature information, the mobile terminal can further send the current position feature information to the server. After receiving the current position feature information sent by the mobile terminal, the server can search a position of an area matching the current position feature information in the database stored therein. Since the initial position feature information input by the user is the information obtained at his/her current position, the position determined by the server is the current position of the user, that is, the initial position for determining a navigation route.

For example, when the user inputs a parking space identification, the server can search a position of a parking space of this identification in the database and take the position as an initial position. When the user inputs a license plate number, the server can search a position of a vehicle of this license plate number in the database and take the position as an initial position.

In S102, a position of one empty area is determined as a target position based on the position information corresponding to the respective areas and the correspondence relationship between the identification information of the respective areas and the respective feature information currently stored in the database.

After determining the initial position, the server can further determine the target position. Specifically, according to different needs, the target position can be an empty parking space or a position where the user's vehicle is parked.

When the user wants to park, in an implementation, the server can determine positions of all current empty areas based on the position information corresponding to the respective areas and the correspondence relationship between the identification information of the respective areas and the respective feature information currently stored in the database, and determine a position of one of the empty areas as the target position.

In another implementation, in order to improve the user experience, the server can display all the empty areas on an electronic map of the mobile terminal based on the position information corresponding to the respective areas and the correspondence relationship between the identification information of the respective areas and the respective feature information currently stored in the database, and one of the empty areas can be selected as a target position by the user. For example, the user can select a position closer to him/her through the mobile terminal. The mobile terminal sends this position to the server, and the server can directly take this position as the target position.

It should be noted that when the server displays all the empty areas on the electronic map, only the empty areas can be displayed. Alternatively, in order to make the user know a parking condition of the entire parking lot, non-empty areas can also be displayed on the electronic map, and the empty areas and the non-empty areas are marked out. Further, the user can select one of the empty areas, and take the position thereof as the target position.

When the user wants to find his/her parked vehicle, the target location is the position of the user's parked vehicle. In this case, the user can input the target position feature information through the mobile terminal. The target position feature information can be at least one of a parking space identification, a license plate number or a comparison image.

For example, when the user wants to find his/her parked vehicle, he/she can input the license plate number or vehicle image of his/her vehicle, or when the user remembers the parking space identification when parking, he/she can input the parking space identification as target position feature information.

After the user inputs the target position feature information to the mobile terminal, the mobile terminal can further send the target position feature information to the server. After receiving the target position feature information sent by the mobile terminal, the server can search a position of an area matching the target position feature information in the database stored therein, and take the position as the target position.

In S103, a first route from the initial position to the target position is determined, and the first route is displayed on an electronic map of the mobile terminal.

After determining the target position and the initial position, the server can determine the first route from the initial position to the target location. For example, the server can take the nearest route among various routes from the initial position to the target position as the first route based on a route distribution in the parking lot.

Any of the existing techniques can be employed in the process of determining the first route from the initial position to the target position by the server, which will not be described in the embodiment of the present application.

After determining the first route from the initial position to the target position, the server can send the first route to the mobile terminal and display the first route on the electronic map of the mobile terminal.

For example, the server can display an electronic map of the parking lot on the mobile terminal and display the first route determined on the electronic map.

The embodiment of the present application provides a navigation method. The server can accurately determine the initial position based on the current position feature information sent by the mobile terminal and the database stored in the server, and can determine the position of one empty area in the database as the target position. Further, the server can determine the route from the initial position to the target position based on the initial position and the target position, and display the route on the electronic map of the mobile terminal. Therefore, it is possible to provide the user with accurate navigation information and make him find an empty parking space in a large parking lot quickly.

As an implementation of the embodiment of the present application, in order to make the server create an accurate database, a corresponding image acquiring device can be configured in each area. The image acquiring device can acquire a feature image of a corresponding area, and can obtain corresponding feature information based on the feature image and send it to the server. Further, the server can create a database based on correspondence relationship between respective feature information and respective areas, as well as positions of respective areas.

For example, a corresponding image acquiring device can be configured at each area, or when the range of the area is relatively small and an image acquiring area of one image acquiring device can include a plurality of areas, one image acquiring device can correspond to a plurality of areas. Respective image acquiring devices can periodically acquire feature images of the corresponding areas in a set time interval, and can obtain corresponding feature information based on the feature images and send it to the server.

In one implementation, the image acquiring device can send the acquired feature image directly to the server as the feature information. In another implementation, the image acquiring device can perform feature extraction on the acquired feature image to extract feature information therein, and send the feature information to the server.

For example, the image acquiring device can use any of the existing image analysis methods to identify the feature information such as a parking space identification and a license plate number in the feature image, and send the feature information extracted to the server in the form of text as the current position feature information. Alternatively, when identifying the feature information such as the parking space identification and the license plate number in the feature image, the mobile terminal can obtain an image of an area containing the feature information and send the image to the server as the current position feature information.

Any of the existing method can be employed in the process of extracting the feature information from the feature image by the image acquiring device, which will not be described in the embodiment of the present application.

Optionally, respective image acquiring devices can detect whether or not the content contained in corresponding areas thereof is changed so as to avoid the excessive load of the image acquiring devices caused by periodically acquiring the feature images. For example, the image acquiring device can detect whether the corresponding area thereof is changed from an empty state to a state that a vehicle is parked therein, or detect whether the vehicle parked in the corresponding area is changed.

When the image acquiring device detects that the content contained in the corresponding area is changed, it can acquire a feature image of the area. That is to say, the image acquiring device can acquire a feature image corresponding to a changed area, thereby ensuring the accuracy of the database stored in the server while the load pressure of respective image acquiring devices is reduced.

Figure 2:
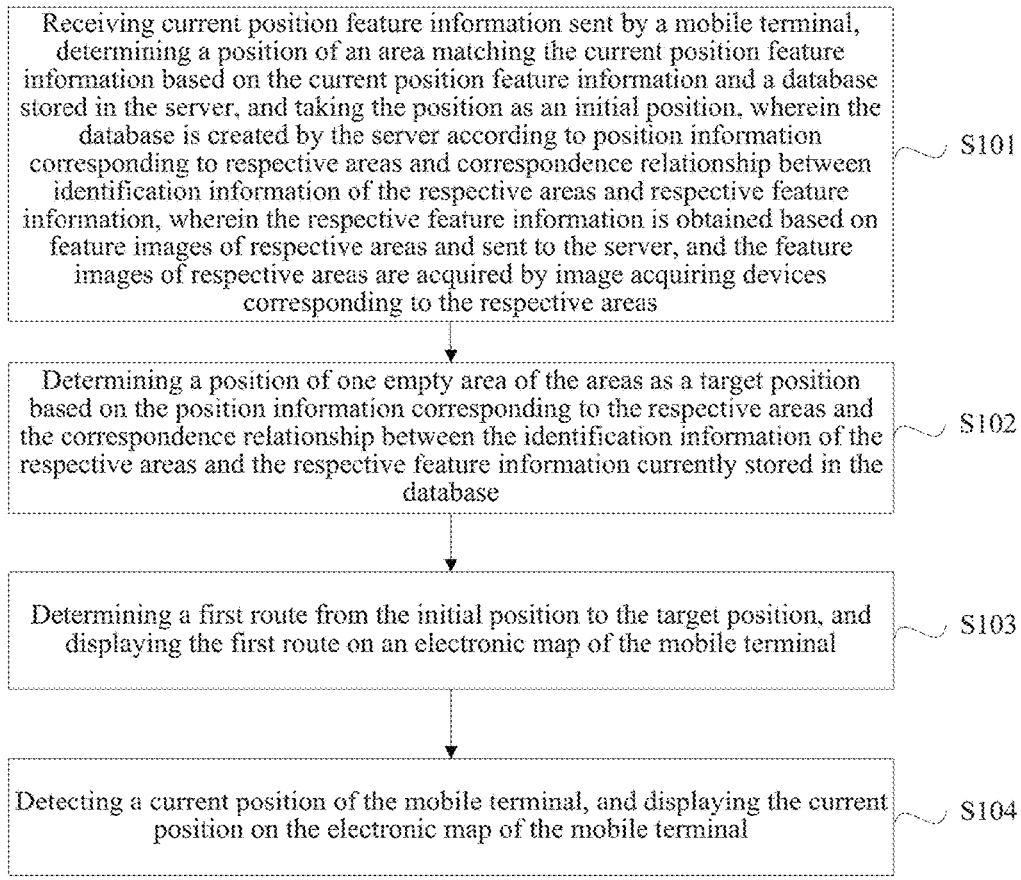
FIG. 2 is another flow chart of a navigation method provided according to an embodiment of the present application.

As an implementation of the embodiment of the present application, as shown in FIG. 2, the navigation method provided by the present application, after step S103, can further include step S104.

In S104, a current position of the mobile terminal is detected, and the current position is displayed on the electronic map of the mobile terminal.

In the embodiment of the present application, after determining the first route from the initial position to the target position and displays the first route on the electronic map of the mobile terminal, the server can also detect a current position of the mobile terminal and display the current position on the electronic map of the mobile terminal.

In one implementation, the server can obtain a movement state of the mobile terminal, such as acceleration, angular acceleration and the like of the mobile terminal, based on an inertial sensor in the mobile terminal, such as an accelerometer, a gyroscope and the like, and then can determine the current position of the mobile terminal based on the initial position obtained previously and the movement state of the mobile terminal.

When the server determines the current position of the mobile terminal based on the inertial sensor in the mobile terminal, in some cases, the determined position can be inaccurate.

Thus, in the present embodiment, the user can determine whether the current position displayed on the mobile terminal is correct based on the current position displayed on the mobile terminal and a current actual position of the user. When determining that the current position displayed on the mobile terminal has a relatively large difference from the position of the user, the user can perform position correction.

Specifically, the user can input a position correction instruction in the mobile terminal. The mobile terminal can send the position correction instruction to the server when receiving the position correction instruction input by the user. Additionally, the user can input current position feature information again through the mobile terminal, and further, the mobile terminal can send the current position feature information to the server, so that the server determines a position of an area matching the current position feature information based on the current position feature information and the database stored therein, and updates the current position of the mobile terminal with this position.

The process of inputting current position feature information by the user through the mobile terminal and the process of determining a position of an area matching the current position feature information by the server based on the current position feature information and the database are similar to the above process of determining the initial position and will not be described in the embodiment of the present application.

In another implementation, in order to improve the accuracy of determining the current position, the server can receive current position feature information periodically sent by the mobile terminal, determine a position of an area matching the current position feature information based on the current position feature information and the database stored in the server, take the position as the current position, and display the current position on the electronic map of the mobile terminal.

Any of the existing methods can be also employed in the process of determining the current position by the server, which will not be described in the embodiment of the present application.

By detecting the current position of the mobile terminal and displaying the current position on the electronic map of the mobile terminal, the user can obtain his/her real-time position to determine whether his/her route is correct.

Figure 3:
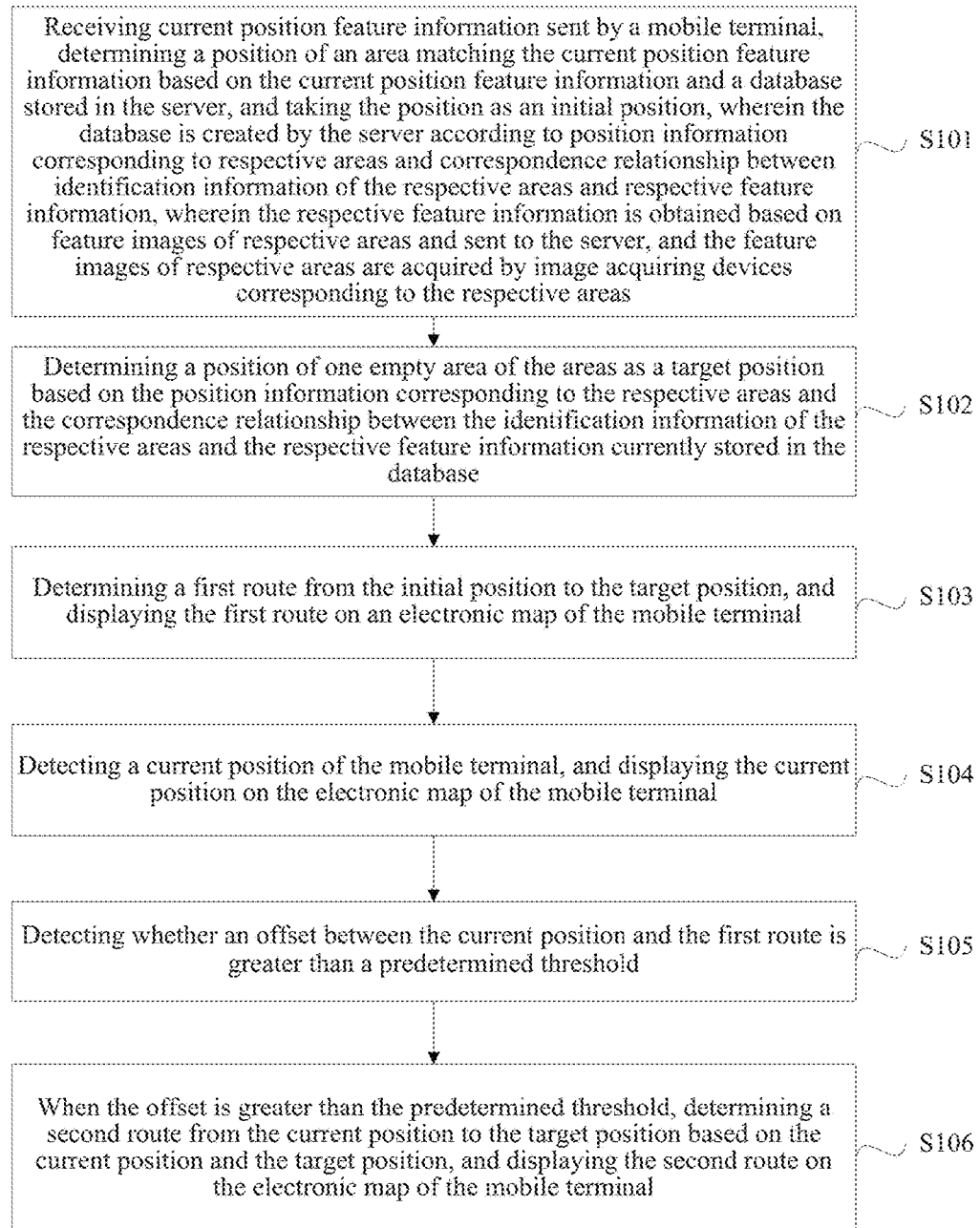
FIG. 3 is another flow chart of a navigation method provided according to an embodiment of the present application.

As an implementation of the embodiment of the present application, as shown in FIG. 3, the navigation method provided by the present application, after step S104, can further include steps S105-S106.

In S105, it is detected whether an offset between the current position and the first route is greater than a predetermined threshold.

In some cases, when the server displays the first route on the mobile terminal, the route of the user can also deviate from the first route.

In the embodiment of the present application, the server can detect whether the offset between the current position of the mobile terminal and the first route is greater than a predetermined threshold, such as 3 m, 5 m, 10 m, and the like.

Specifically, the user can compare whether a minimum distance between the current position of the mobile terminal and the first route is greater than the predetermined threshold based on the first route and the current position of the mobile terminal. If the minimum distance is greater than the predetermined threshold, the user determines whether the offset between the current position and the first route is greater than the predetermined threshold.

In S106, when the detected offset between the current position and the first route is greater than the predetermined threshold, a second route from the current position to the target position is determined based on the current position and the target position, and the second route is displayed on the electronic map of the mobile terminal.

When determining that the offset between the current position of the mobile terminal and the first route is greater than the predetermined threshold, the server can determine a second route from the current position to the target position based on the current position and the target position, and display the second route on the electronic map of the mobile terminal.

Any of the existing techniques can be employed in the process of determining the second route from the current position to the target position by the server, which will not be described in the embodiment of the present application.

In the present scheme, when determining that the offset between the current position of the mobile terminal and the first route is greater than the predetermined threshold, the server can re-plan a route based on the current position of the mobile terminal and the target position, thereby ensuring that the user smoothly reach the target position and improving the user experience.

In order to provide the user with accurate navigation information and improve the user experience, the present application provides a navigation method applied to a mobile terminal. As shown in FIG. 4, the method can include steps S201-S202.

In S201, current position feature information is obtained and sent to a server, so then the server determines a position of an area matching the current position feature information based on the current position feature information and a database stored therein, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas.

In the embodiment of the present application, when entering a parking lot, the user can use his/her mobile terminal to obtain the current position feature information. Further, the mobile terminal can send the current position feature information to the server, so that the server determines a position of an area matching the current position feature information based on the current position feature information and the database stored therein, and takes the position as an initial position.

The current position feature information input by the user through the mobile terminal can be at least one of a parking space identification, a license plate number, a comparison image or the like.

For example, when entering a parking lot, the user can input the identification of a parking space which he/she is on currently into the mobile terminal as the current position feature information; or, when there is a vehicle parked at the user's current position, he/she can input the license plate number of the vehicle as the current position feature information; or, the user can also take a feature image at the his/her current position by a photographing function of the mobile terminal and obtain the current position feature information based on the feature image.

When obtaining the feature image, the mobile terminal can send directly the feature image to the server as the current position feature information. Alternatively, the mobile terminal can perform a feature extraction on an acquired feature image to extract the feature information therein, and send it to the server as the current position feature information. When the mobile terminal extracts the feature information in the feature image, the feature information extracted can be an image, and can be also a text.

For example, the mobile terminal can use any one of the existing image analysis methods to identify the feature information such as a parking space identification and a license plate number in the feature image, and send the feature information extracted to the server in the form of text as the current position feature information. Alternatively, when identifying the feature information such as the parking space identification and the license plate number in the feature image, the mobile terminal can obtain an image of an area containing the feature information and send the image to the server as the current position feature information.

Any of the existing methods can be employed in the process of extracting the feature information from the feature image by the mobile terminal, which will not be described in the embodiment of the present application.

After obtaining the current position feature information, the mobile terminal can further send the current position feature information to the server. After receiving the current position feature information sent by the mobile terminal, the server can search a position of an area matching the current position feature information in the database stored therein. Since the initial position feature information input by the user is the information obtained at his/her current position, the position determined by the server is the current position of the user, that is, the initial position for determining a navigation route.

For example, when the user inputs a parking space identification, the server can search a position of a parking space of this identification in the database and take the position as an initial position. When the user inputs a license plate number, the server can search a position of a vehicle of this license plate number in the database and take the position as the initial position.

In S202, a route sent by the server is received and displayed on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

In the embodiment of the present application, after determining the initial position, the server can further determine the target position. Specifically, according to different needs, the target position can be an empty parking space or a position where the user's vehicle is parked.

When the user wants to park, in an implementation, the server can determine positions of all current empty areas based on the position information corresponding to the respective areas and the correspondence relationship between the identification information of the respective areas and the respective feature information currently stored in the database, and determine a position of one of the empty areas as the target position.

In another implementation, in order to improve the user experience, the server can display all the empty areas on an electronic map of the mobile terminal based on the position information corresponding to the respective areas and the correspondence relationship between the identification information of the respective areas and the respective feature information currently stored in the database, and one of the empty areas can be selected by the user as a target position. For example, the user can select a position closer to him/her through the mobile terminal. The mobile terminal sends this position to the server, and the server can directly take this position as the target position.

It should be noted that when the server displays all the empty areas on the electronic map, only the empty areas can be displayed. Alternatively, in order to make the user know a parking condition of the entire parking lot, non-empty areas can also be displayed on the electronic map, and the empty areas and the non-empty areas are marked out. Further, the user can select one of the empty areas, and take the position thereof as the target position.

When the user wants to find his/her parked vehicle, the target location is the position of the user's parked vehicle. In this case, the user can input the target position feature information through the mobile terminal. The target position feature information can be at least one of a parking space identification, a license plate number or a comparison image.

For example, when the user wants to find his/her parked vehicle, he/she can input the license plate number or vehicle image of his/her vehicle, or when the user remembers the parking space identification while parking, he/she can input the parking space identification as target position feature information.

After the user inputs the target position feature information into the mobile terminal, the mobile terminal can further send the target position feature information to the server. After receiving the target position feature information sent by the mobile terminal, the server can search a position of an area matching the target position feature information in the database stored therein, and take the position as the target position.

After determining the target position and the initial position, the server can determine a route from the initial position to the target location. Any of the existing techniques can be employed in the process of determining the route from the initial position to the target position by the server, which will not be described in the embodiment of the present application.

After determining the route from the initial position to the target position, the server can send the route to the mobile terminal and display the route on the electronic map of the mobile terminal.

The embodiment of the present application provides a navigation method. The server can accurately determine the initial position based on the current position feature information sent by the mobile terminal and the database stored in the server, and can determine the position of one empty area in the database as the target position. Further, the server can determine the route from the initial position to the target position based on the initial position and the target position, and display the route on the electronic map of the mobile terminal. Therefore, it is possible to provide the user with accurate navigation information and make him find an empty parking space in a large parking lot quickly.

As an implementation of the embodiment of the present application, as shown in FIG. 5, the navigation method provided by the present application, after step S202, can include step S203.

In S203, a current position of the mobile terminal sent by the server is received and the current position is displayed on the electronic map of the mobile terminal.

In the embodiment of the present application, after determining the route from the initial position to the target position and displaying the route on the electronic map of the mobile terminal, the server can also detect a current position of the mobile terminal and send the current position to the mobile terminal.

In an implementation, the server can obtain a movement state of the mobile terminal, such as acceleration, angular acceleration and the like of the mobile terminal, based on an inertial sensor in the mobile terminal, such as an accelerometer, a gyroscope and the like, and then can determine the current position of the mobile terminal based on the initial position obtained previously and the movement state of the mobile terminal.

When the server determines the current position of the mobile terminal based on the inertial sensor in the mobile terminal, in some cases, the determined position can be inaccurate.

Thus, in the present embodiment, the user can determine whether the current position displayed on the mobile terminal is correct based on the current position displayed on the mobile terminal and a current actual position of the user. When determining that the current position displayed on the mobile terminal has a relatively large difference from the position of the user, the user can perform position correction.

Specifically, the user can input a position correction instruction in the mobile terminal. The mobile terminal can send the position correction instruction to the server when receiving the position correction instruction input by the user. Additionally, the user can input current position feature information again through the mobile terminal, and further, the mobile terminal can send the current position feature information to the server, so that the server determines a position of an area matching the current position feature information based on the current position feature information and the database stored therein, and updates the current position of the mobile terminal with this position.

The process of inputting current position feature information by the user through the mobile terminal and the process of determining a position of an area matching the current position feature information by the server based on the current position feature information and the database are similar to the above process of determining the initial position and will not be described in the embodiment of the present application.

In another implementation, in order to improve the accuracy of determining the current position, the server can receive current position feature information periodically sent by the mobile terminal, determine a position of an area matching the current position feature information based on the current position feature information and the database stored in the server, take the position as the current position, and display the current position on the electronic map of the mobile terminal.

Any of the existing methods can be also employed in the process of determining the current position by the server, which will not be described in the embodiment of the present application.

Therefore, the mobile terminal can receive the current position sent by the server and display the current position on the electronic map thereof.

By detecting the current position of the mobile terminal and displaying the current position on the electronic map of the mobile terminal, the user can obtain his/her real-time position to determine whether his/her route is correct.

An embodiment of the present application also provides a device embodiment corresponding to the above method embodiment.

FIG. 6 is a navigation device provided in an embodiment of the present application, which is applied to a server. The device includes:

a first processing module 610 used to receive current position feature information sent by a mobile terminal, determine a position of an area matching the current position feature information based on the current position feature information and a database stored in the server, and take the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

a determining module used to determine a position of one empty area of the areas as a target position based on the position information corresponding to the respective areas and the correspondence relationship between the identification information of the respective areas and the respective feature information currently stored in the database; and a second processing module used to determine a first route from the initial position to the target position, and display the first route on an electronic map of the mobile terminal.

The embodiment of the present application provides a navigation device. The server can accurately determine the initial position based on the current position feature information sent by the mobile terminal and the database stored in the server, and can determine the position of one empty area in the database as the target position. Further, the server can determine the route from the initial position to the target position based on the initial position and the target position, and display the route on the electronic map of the mobile terminal. Therefore, it is possible to provide the user with accurate navigation information and make him find an empty parking space in a large parking lot quickly.

As an implementation of the present application, the determining module 620 is specifically used to display positions of respective empty areas on the electronic map of the mobile terminal based on the position information corresponding to the respective areas and the correspondence relationship between identification information of the respective areas and the respective feature information currently stored in the database, receive one of the positions of respective empty areas sent by the mobile terminal, and determine this position as the target position; or determine positions of all current empty areas based on position information corresponding to the respective areas and correspondence relationship between identification information of the respective areas and the respective feature information currently stored in the database, and determine a position of one of the empty areas as the target position.

Figure 7:
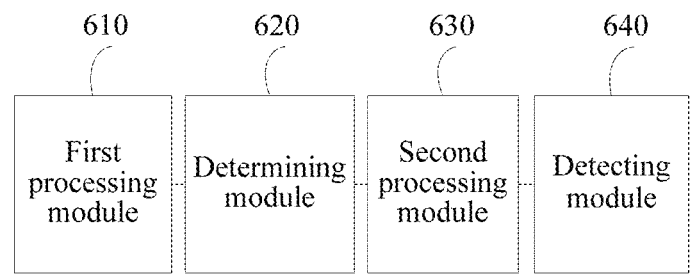
FIG. 7 is another schematic structural view of a navigation device provided according to an embodiment of the present application.

As an implementation of the present application, as shown in FIG. 7, the device further includes:

a detecting module 640 used to detect a current position of the mobile terminal, and display the current position on the electronic map of the mobile terminal.

As an implementation of the present application, the detecting module 640 includes:

an obtaining sub-module (not shown) used to obtain a movement state of the mobile terminal based on an inertial sensor in the mobile terminal;

a determining sub-module (not shown) used to determine the current position of the mobile terminal based on the initial position of the mobile terminal and the movement state.

As an implementation of the present application, the device further includes:

a third processing module (not shown) used to receive the current position feature information sent by the mobile terminal when receiving a position correction instruction sent by the mobile terminal, determine a position of an area matching the current position feature information based on the current position feature information and the database, and update the current position of the mobile terminal with this position.

As an implementation of the present application, the detecting module 640 is specifically used to receive the current position feature information periodically sent by the mobile terminal, determine a position of an area matching the current position feature information based on the current position feature information and the database, and take the position as the current position.

As an implementation of the present application, the detecting module 640 is also used to detect whether an offset between the current position and the first route is greater than a predetermined threshold. The device further includes:

a fourth processing module (not shown) used to determine a second route from the current position to the target position based on the current position and the target position, and display the second route on the electronic map of the mobile terminal, when the detecting module detects that the offset between the current position and the first route is greater than the predetermined threshold.

As an implementation of the present application, the database stores the identification information and the position information corresponding to each of parking spaces and a license plate number or image of a vehicle parked currently; the current position feature information includes at least one of: identification information of a parking space, a license plate number or a comparison image.

As an implementation of the present application, for each area, the feature image of the area is acquired by the image acquiring device corresponding to the area after detecting that content included in the area is changed.

Figure 8:
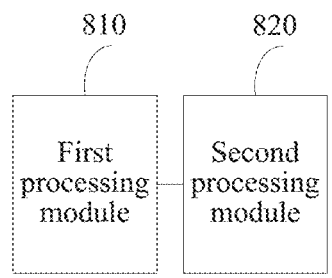
FIG. 8 is another schematic structural view of a navigation device provided according to an embodiment of the present application.

FIG. 8 is a navigation device provided in the present application, which is applied to a mobile terminal. The device includes:

a first processing module 810 used to obtain current position feature information and send the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

a second processing module 820 used to receive a route sent by the server and display the route on an electronic map, wherein the route is a route from the initial position to a target position, which is determined by the server after determining a position of one empty area of the areas as the target position based on position information corresponding to the respective areas and correspondence relationship between identification information of the respective areas and the respective feature information currently stored in the database.

The embodiment of the present application provides a navigation device. The server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Figure 9:
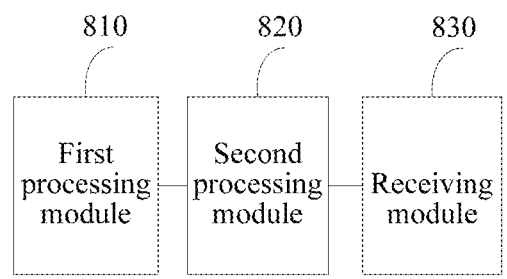
FIG. 9 is another schematic structural view of a navigation device provided according to an embodiment of the present application.

As an implementation of the present application, as shown in FIG. 9, the device further includes:

a receiving module 830 used to receive a current position of the mobile terminal sent by the server and display the current position on the electronic map of the mobile terminal.

As an implementation of the present application, the first processing module 810 is specifically used to receive current position feature information input by the user;

acquire a feature image and take the feature image as the current position feature information; or acquire a feature image and extract the current position feature information in the feature image, wherein the current position feature information includes at least one of an image including a preset area in the feature image and a character in the preset area.

As an implementation of the present application, the database stores the identification information and the position information corresponding to each of parking spaces and a license plate number or image of a vehicle parked currently; the current position feature information includes at least one of: identification information of a parking space, a license plate number or a comparison image.

Figure 10:
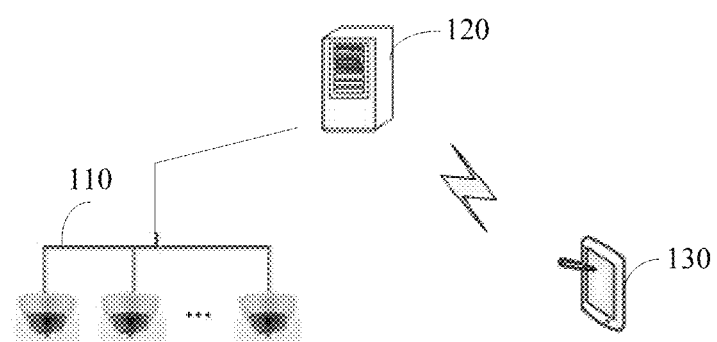
FIG. 10 is a schematic structural view of a navigation system provided according to an embodiment of the present application.

FIG. 10 is a navigation system provided by an embodiment of the present application, which includes image acquiring devices 110 installed in respective areas, a navigation device as shown in FIGS. 7 to 8 located in the server 120, and a navigation device as shown in FIG. 9 located in the mobile terminal 130.

The embodiment of the present application provides a navigation system. The server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

The embodiment of the present application provides a navigation system including image acquiring devices installed in respective areas, a server and a mobile terminal.

The image acquiring devices are used to acquire feature images of corresponding areas;

The server is used to perform the navigation method as described in FIGS. 1 to 3;

The mobile terminal is used to perform the navigation method as described in FIGS. 4 to 5.

The embodiment of the present application provides a navigation system. The server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application also provides a storage medium for storing executable program codes, which perform the navigation method described in the present application when being executed. The navigation method described in the present application includes:

receiving current position feature information sent by a mobile terminal, determining a position of an area matching the current position feature information based on the current position feature information and a database stored in a server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

determining a position of one empty area of the areas as a target position based on the position information corresponding to the respective areas and the correspondence relationship between the identification information of the respective areas and the respective feature information currently stored in the database; and determining a first route from the initial position to the target position, and displaying the first route on an electronic map of the mobile terminal.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application also provides a storage medium for storing executable program codes, which perform the navigation method described in the present application when being executing. The navigation method described in the present application includes:

obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application also provides an application, which is used to perform the navigation method described in the present application when being executed. The navigation method described in the present application includes:

receiving current position feature information sent by a mobile terminal, determining a position of an area matching the current position feature information based on the current position feature information and a database stored in a server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

determining a position of one empty area of the areas as a target position based on the position information corresponding to the respective areas and the correspondence relationship between the identification information of the respective areas and the respective feature information currently stored in the database; and determining a first route from the initial position to the target position, and displaying the first route on an electronic map of the mobile terminal.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application also provides an application, which is used to perform the navigation method described in the present application when being executed. The navigation method described in the present application includes:

obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application provides an electronic device comprising:

a processor, a memory, a communication interface and a bus, wherein the processor, the memory and the communication interface are connected and communicated with each other via the bus;

the memory stores executable program codes; and the processor performs the navigation method described in the present application by reading the executable program codes stored in the memory. The navigation method described in the present application includes:

receiving current position feature information sent by a mobile terminal, determining a position of an area matching the current position feature information based on the current position feature information and a database stored in a server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;

determining a position of one empty area of the areas as a target position based on the position information corresponding to the respective areas and the correspondence relationship between the identification information of the respective areas and the respective feature information currently stored in the database; and determining a first route from the initial position to the target position, and displaying the first route on an electronic map of the mobile terminal.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

Correspondingly, the present application provides an electronic device comprising:

a processor, a memory, a communication interface and a bus, wherein the processor, the memory and the communication interface are connected and communicated with each other via the bus;

the memory stores executable program codes; and the processor performs the navigation method described in the present application by reading the executable program codes stored in the memory. The navigation method described in the present application includes:

obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between the identification information of the respective areas and the respective feature information currently stored in the database.

In the embodiment of the present application, the server can accurately determine the initial position based on the current position feature information sent by the mobile terminal and the database stored in the server, and can determine the position of one empty area in the database as the target position. Further, the server can determine a route from the initial position to the target position based on the initial position and the target position, and display the route on the electronic map of the mobile terminal. Therefore, it is possible to provide the user with accurate navigation information and make him find an empty parking space in a large parking lot quickly.

For the device/system/storage medium/application program/electronic device embodiments, since they are substantially similar to the method embodiment, the descriptions thereof are relatively simple, and the related parts can refer to the part description of the method embodiment.

It should be noted that the relationship terms herein such as "first", "second" and the like are only used to distinguish one entity or operation from another entity or operation, but do not necessarily require or imply that there is any such actual relationship or sequence between these entities or operations. Moreover, the terms "comprise", "include" or any variants thereof are intended to cover a non-exclusive inclusion, such that processes, methods, articles or devices comprising a series of elements include not only those elements listed, but also other elements not specifically listed or the elements intrinsic to those processes, methods, articles, or devices. Without further limitations, elements limited by the statement "comprise(s) a/an . . . " do not exclude that there are additional identical elements in the processes, methods, articles, or devices which include the elements.

All embodiments in the present description are described in a correlated manner, and identical or similar parts in various embodiments can be referred to one another. The description for each embodiment focuses on the differences with other embodiments. Especially, the device embodiments are described in a concise manner and related contents thereof can refer to the part description of the method embodiments, since the device embodiments are substantially similar to the method embodiments.

Those ordinary skilled in the art should understand that all or part of the steps in the above method implementation can be implemented by a program to command the associated hardware, and the program can be stored in a computer readable storage medium, such as ROM/RAM, disk, CD and so on.

Embodiments described above are just preferred embodiments of the present application, and not intended to limit the scope of the present application. Any modifications, equivalent substitutions, improvements or the like within the spirit and principle of the present application should be included in the scope of the present application.

The invention claimed is:

1. A navigation method applied to a server, comprising:
receiving current position feature information sent by a mobile terminal, determining a position of an area matching the current position feature information based on the current position feature information and a database stored in the server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;
determining a position of one empty area of the areas as a target position based on the position information corresponding to the respective areas and the correspondence relationship between the identification information of the respective areas and the respective feature information currently stored in the database; and
determining a first route from the initial position to the target position, and displaying the first route on an electronic map of the mobile terminal.

2. The method according to claim 1, wherein determining a position of one empty area of the areas as a target position based on the position information corresponding to the respective areas and the correspondence relationship between the identification information of the respective areas and the respective feature information currently stored in the database comprises:
displaying positions of respective empty areas on the electronic map of the mobile terminal based on the position information corresponding to the respective areas and the correspondence relationship between the identification information of the respective areas and the respective feature information currently stored in the database, receiving one of the positions of respective empty areas sent by the mobile terminal, and determining this position as the target position; or
determining positions of all current empty areas based on the position information corresponding to the respective areas and the correspondence relationship between identification information of the respective areas and the respective feature information currently stored in the database, and determining a position of one of the empty areas as the target position.

3. The method according to claim 1, wherein after displaying the first route on an electronic map of the mobile terminal, the method further comprises:
detecting a current position of the mobile terminal, and displaying the current position on the electronic map of the mobile terminal.

4. The method according to claim 3, wherein detecting a current position of the mobile terminal comprises:
obtaining a movement state of the mobile terminal based on an inertial sensor in the mobile terminal; and
determining the current position of the mobile terminal based on the initial position of the mobile terminal and the movement state.

5. The method according to claim 4, wherein after displaying the current position on the electronic map of the mobile terminal, the method further comprises:
receiving current position feature information sent by the mobile terminal after receiving a position correction instruction sent by the mobile terminal, determining a position of an area matching the current position feature information based on the current position feature information and the database, and updating the current position of the mobile terminal with the position.

6. The method according to claim 3, wherein detecting a current position of the mobile terminal comprises:
receiving current position feature information periodically sent by the mobile terminal, determining a position of an area matching the current position feature information based on the current position feature information and the database, and taking the position as the current position.

7. The method according to claim 3, wherein the method further comprises:
detecting whether an offset between the current position and the first route is greater than a predetermined threshold; and
if the offset is greater than the predetermined threshold, determining a second route from the current position to the target position based on the current position and the target position, and displaying the second route on the electronic map of the mobile terminal.

8. The method according to claim 1, wherein the database stores the identification information and the position information corresponding to each of parking spaces and a license plate number of a vehicle parked currently or an image of a vehicle parked currently; and the current position feature information includes at least one of: identification information of a parking space, a license plate number or a comparison image.

9. The method according to claim 1, wherein for each area, the feature image of the area is acquired by an image acquiring device corresponding to the area after detecting a change of content included in the area.

10. A navigation method applied to a mobile terminal, comprising:
obtaining current position feature information, and sending the current position feature information to a server, so that the server determines a position of an area matching the current position feature information based on the current position feature information and a database stored therein, and takes the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas; and
receiving a route sent by the server and displaying the route on an electronic map, wherein the route is a route from the initial position to a target position, which is determined by the server after determining a position of one empty area of the areas as the target position based on the position information corresponding to the respective areas and the correspondence relationship between identification information of the respective areas and the respective feature information currently stored in the database.

11. The method according to claim 10, wherein after displaying the route on an electronic map, the method further comprises:
receiving a current position of the mobile terminal sent by the server and displaying the current position on the electronic map of the mobile terminal.

12. The method according to claim 10, wherein obtaining current position feature information comprises:
receiving the current position feature information input by the user; or
acquiring a feature image and taking the feature image as the current position feature information; or
acquiring a feature image and extracting the current position feature information in the feature image, wherein the current position feature information includes at least one of an image including a preset area in the feature image and a character in the preset area.

13. The method according to claim 10, wherein the database stores the identification information and the position information corresponding to each of parking spaces, and a license plate number of a vehicle parked currently or an image of a vehicle parked currently; and the current position feature information includes at least one of: identification information of a parking space, a license plate number or a comparison image.

14. A navigation system, comprising image acquiring devices installed in respective areas, a server and a mobile terminal,
wherein the image acquiring devices are used to acquire feature images of corresponding areas;
the server is used to perform a navigation method comprising:
receiving current position feature information sent by a mobile terminal, determining a position of an area matching the current position feature information based on the current position feature information and a database stored in the server, and taking the position as an initial position, wherein the database is created by the server according to position information corresponding to respective areas and correspondence relationship between identification information of the respective areas and respective feature information, wherein the respective feature information is obtained based on feature images of respective areas and sent to the server, and the feature images of respective areas are acquired by image acquiring devices corresponding to the respective areas;
determining a position of one empty area of the areas as a target position based on the position information corresponding to the respective areas and the correspondence relationship between the identification information of the respective areas and the respective feature information currently stored in the database; and
determining a first route from the initial position to the target position, and displaying the first route on an electronic map of the mobile terminal; and
the mobile terminal is used to perform a navigation method of comprising:
obtaining the current position feature information, and sending the current position feature information to the server, so that the server determines the position of the area matching the current position feature information based on the current position feature information and the database stored therein, and takes the position as the initial position; and
receiving a route sent by the server and displaying the route on the electronic map, wherein the route is a route from the initial position to the target position, which is determined by the server after determining the position of one empty area of the areas as the target position based on the position information corresponding to the respective areas and the correspondence relationship between identification information of the respective areas and the respective feature information currently stored in the database.

15. An electronic device, comprising:
a processor, a memory, a communication interface and a bus,
wherein the processor, the memory and the communication interface are connected and communicated with each other via the bus;
the memory stores executable program codes; and
the processor executes a program corresponding to the executable program codes by reading the executable program codes stored in the memory to perform the navigation method of claim 1.

16. An electronic device, comprising:
a processor, a memory, a communication interface and a bus,
wherein the processor, the memory and the communication interface are connected and communicated with each other via the bus;
the memory stores executable program codes; and
the processor executes a program corresponding to the executable program codes by reading the executable program codes stored in the memory to perform the navigation method of claim 10.

* * * * *